United States Patent [19]

Schiefer

[11] Patent Number: 5,709,750
[45] Date of Patent: Jan. 20, 1998

[54] APPARATUS FOR APPLYING A LIQUID MEDIUM

[76] Inventor: Rolf Schiefer, Arnoldstr. 14, D-41238 Mönchengladbach, Germany

[21] Appl. No.: 613,052

[22] Filed: Mar. 8, 1996

[30] Foreign Application Priority Data

Mar. 15, 1995 [DE] Germany ............... 295 04 451.9

[51] Int. Cl.[6] .................................................. B05C 3/02
[52] U.S. Cl. .................. 118/410; 118/419; 425/466; 239/451; 239/455; 239/456
[58] Field of Search .................. 118/410, 419; 425/466; 427/356, 420; 239/451, 455, 456; 222/556, 558

[56] References Cited

U.S. PATENT DOCUMENTS 5,284,430 2/1994 Tomic et al. .................. 425/466

*Primary Examiner*—Laura Edwards
*Assistant Examiner*—Michael P. Colaianni
*Attorney, Agent, or Firm*—Mason, Kolehmainen, Rathburn & Wyss

[57] ABSTRACT

An apparatus for applying a liquid medium has an application slot whose width of opening is defined by the mutual spacing of its longitudinal edges, and means for feeding liquid medium to the application slot. The width of opening of the application slot is adjustable between a maximum width and a closed position permitting the medium to be precisely cut off when the application operation is concluded by closing the slot.

10 Claims, 5 Drawing Sheets

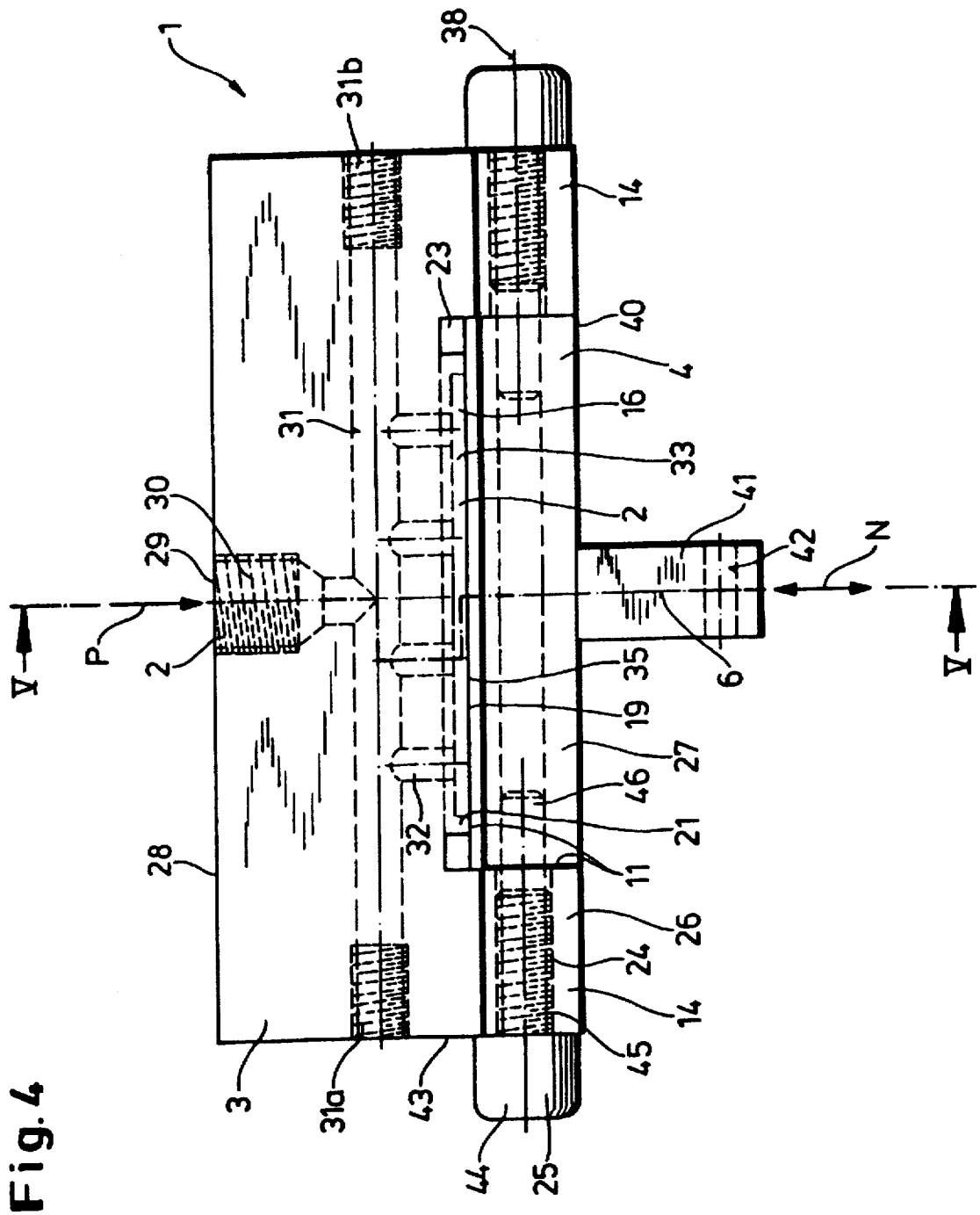

APPARATUS FOR APPLYING A LIQUID MEDIUM

FIELD OF THE INVENTION

The invention concerns an apparatus for applying a liquid medium.

In this specification the term liquid medium is used to denote a medium which is liquid or viscous and may be for example glue, paint, dye or the like which can be applied by means of a flow thereof.

BACKGROUND OF THE INVENTION

One form of apparatus for applying a liquid medium comprises an application slot formed by longitudinal edges whose mutual spacing defines the width of opening of the slot. The apparatus includes means for feeding the liquid medium to be applied, to the application slot.

Such an apparatus is used more especially for applying a liquid medium over a wide or large surface area. A conventional apparatus which operates in that way and which is referred to as a wide-slot nozzle apparatus comprises an application slot which is provided for example in an application mask that can be clamped in position or otherwise suitably fixed in the apparatus, with the width of the application slot being invariable. The width of opening of the application slot can only be changed by changing the application mask and replacing it by another mask with an application slot of a different size. While a liquid medium is being applied therefore the application slot always remains opened to a given width so that there is no possibility of altering the area over which the liquid medium is applied, during the operation for applying it. Particularly when the apparatus is switched off, for example in an intermittent mode of operation of applying a liquid medium, the medium can escape from the application slot in an undesirable manner and uncontrolledly, depending on its respective viscosity. Such an apparatus cannot therefore ensure that the medium issuing from the slot is precisely cut off when the apparatus is switched off, in order to ensure that application of the medium is terminated in a specific and controlled fashion. This however is a necessary requirement when for example glue is to be applied by means of the apparatus, in order to attach labels to the surface to which the glue is applied. More specifically, if the glue is applied not only in the region which is intended to receive the labels but also beside or outside such a region, the materials such as sheets to which the glue is applied, for example upon being formed into a stack, would tend to stick together.

SUMMARY OF THE INVENTION

An object of the present invention is to provide an apparatus for applying a liquid medium which permits controlled specific application of the liquid medium and in particular precise cut-off of the application thereof upon termination of the application procedure.

Another object of the present invention is to provide an apparatus for applying a liquid medium which can afford a controlled flow of the liquid medium on to a surface to which it is to be applied and which can afford a controlled variation in the application of medium during the application operation.

Still another object of the present invention is to provide an apparatus for applying a liquid medium, which is of a simple design configuration involving a small number of moving parts while affording controlled application of the liquid medium under the operating conditions usually encountered in relation thereto.

In accordance with the principles of the present invention the foregoing and other objects are attained by an apparatus for applying a liquid medium, comprising an application slot whose width of opening is fixed by the mutual spacing of its longitudinal edges. The apparatus includes means for a feed of the medium to the application slot, while at least one of the longitudinal edges of the application slot is displaceable in a direction towards the other.

In a preferred feature of the present invention the width of opening of the application slot is thus adjustable. In that way, on the one hand it is possible for the thickness of the layer of applied medium or the strength of application of the medium to be exactly established prior to the beginning of the application operation, while on the other hand the strength of application of the medium can be precisely established while the application medium is being applied in order to afford adaptation to fluctuating requirements.

In a further preferred embodiment of the invention the longitudinal edges defining the application slot can be brought into sealing contact with each other. In that way the application slot can be at least substantially closed off and the application of medium from the slot can be specifically brought to an end so that it is possible to achieve a precise cut-off effect in regard to the application of the medium to be applied, and it is thus possible to ensure that the liquid medium is applied precisely only where that is wanted.

In another preferred feature the width of opening of the application slot is steplessly adjustable. In that way it is possible to adopt any spacing between the longitudinal edges defining the application slot, from the at least substantially closed condition thereof up to the maximum width of opening thereof.

Another preferred configuration in accordance with the present invention provides that the apparatus includes a main body portion and a bar-like or strip-like member which is mounted thereon displaceably relative thereto, a first longitudinal edge of the application slot being provided by the body portion and the oppositely disposed second longitudinal edge of the application slot being formed by the strip-like or bar-like member. As displacement of the strip-like or bar-like member relative to the body portion of the apparatus provides for control of the width of opening of the application slot, that member will be referred to herein as the control member, for the sake of simplicity. As in this case it is only the displaceable control member that has to be moved in order to adjust the width of opening of the application slot, it is possible for an actuating means for adjusting the width of opening of the application slot to be of a relatively simple design configuration.

Preferably, the means for the feed of medium to the application slot includes a pre-distributor chamber which is disposed between mutually oppositely disposed walls of the main body portion and the control member and has at least one entry opening for the medium, the pre-distributor chamber having a single outlet opening constituting the application slot. In that arrangement it is desirable for the application medium to be applied to be uniformly distributed within the apparatus so that it issues uniformly between the main body portion and the control member when the application slot is opened. In addition, as the application slot is the single outlet opening from the pre-distributor chamber, that prevents any uncontrolled discharge of the medium from the apparatus.

In a preferred configuration in that respect, a depression is provided in a wall of the main body portion of the apparatus, to constitute the pre-distributor chamber. In that case an edge of the depression in the wall of the main body portion forms the first longitudinal edge of the application slot. The depression therefore extends to a position immediately adjoining the application slot, which further promotes uniform discharge of the liquid medium to be applied. When the application slot is closed therefore no residues of the liquid medium remain in small or narrow feed means leading to the application slot so that such feed means do not become blocked up, even when the apparatus is out of use for a prolonged period of time.

In another preferred feature of the invention a groove extends in said wall of the main body portion around the depression and is separated therefrom by a land portion, the groove extending from one end of the application slot to the other. The groove accommodates an elastic sealing means which thus extends around the depression. The cross-sectional shapes of the groove and the sealing means when the sealing means is in a non-compressed condition are different in such a way that, in its non-compression condition, the sealing means projects with an upper portion thereof above the upper edges of the groove and bears with a sealing action against the control member. In that condition, there are free regions in the interior of the groove, more specifically between the inside surface of the groove and the outside surface of the lower portion of the sealing means, which is disposed in the groove. When the sealing means is compressed under the effect of the control member being moved towards the main body portion of the apparatus, said free regions in the interior of the groove are filled up by accommodating the upper portions of the sealing means, which are then urged into the groove, so that, when the sealing means is in a compressed condition, the cross-sectional area thereof corresponds to that of the groove.

The above-outlined design configuration can thus be seen to ensure that, even when the slot is in a fully open condition, the liquid medium to be applied issues to the exterior only from the application slot and not for example laterally. When the application slot is in an open condition, the sealing means does not bear over the full surface area against the side walls and the bottom of the groove, by virtue of the existence of the upper portion thereof which projects above the top edges of the groove. As the application slot when open represents a lower level of resistance to flow therethrough for the liquid medium than the flow resistance between the inside surface of the groove and the outside surface of the sealing means which bears against the groove but not over the full surface area thereof, the sealing effect is sufficient in that operating condition to prevent liquid medium from escaping from the apparatus, outside the application slot. By virtue of the fact that, when the sealing means is in a compressed condition, the cross-sectional surface thereof corresponds to that of the groove, the sealing means in that condition bears over the full surface area thereof against the inside surface of the groove, thereby preventing uncontrolled escape of liquid medium pest the sealing means when the application slot is closed.

Preferably, when the application slot is in a closed condition, the wall surface of the control member also at least partially bears against the land portion. In that situation the elastic sealing means is pushed back into the groove and substantially fills it. When the application slot is closed off pre-distributor chamber is then in part closed off at its edges by the land portion, thereby affording the advantage that, when the liquid medium to be applied is possibly agressive or corrosive, the sealing means comes into contact therewith as little as possible. Because, when the application slot is closed, the groove is filled by the sealing means, the sealing means bears against the walls of the groove substantially over the entire surface area thereof, thereby enhancing the sealing effect.

In a further preferred configuration according to the invention the means for the feed of liquid medium in the main body portion of the apparatus include an intake passage or duct opening into a pre-distributor passage or duct which in turn is in flow communication with the pre-distributor chamber by way of at least one distributor passage or duct. That configuration provides that the liquid medium is already divided into a plurality of individual flows before it reaches the pre-distributor chamber, and such individual flows make it easier for the liquid medium to be uniformly distributed in the pre-distributor chamber.

Further objects, features and advantages of the present invention will be apparent from the following description of a preferred embodiment thereof.

BRIEF DESCRIPTION OF THE DRAWING

FIG. 4 is a plan view of the apparatus according to the invention showing the application slot in a closed condition, with the main body portion and the control member shown in FIGS. 1 through 3, bores in the main body portion and in the control member and the means for holding the control member on the main body portion being shown in broken lines.

DESCRIPTION OF THE PREFERRED EMBODIMENT

Figure 3:
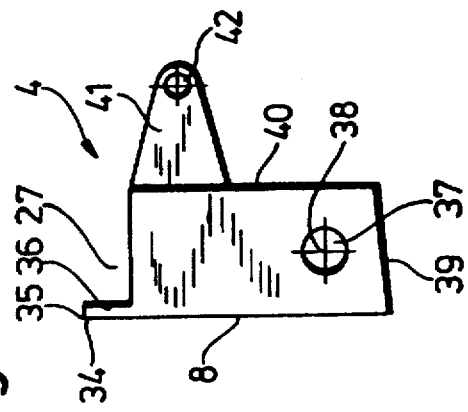
FIG. 3 is a side view of the control member shown in FIG. 2.
Figure 1:
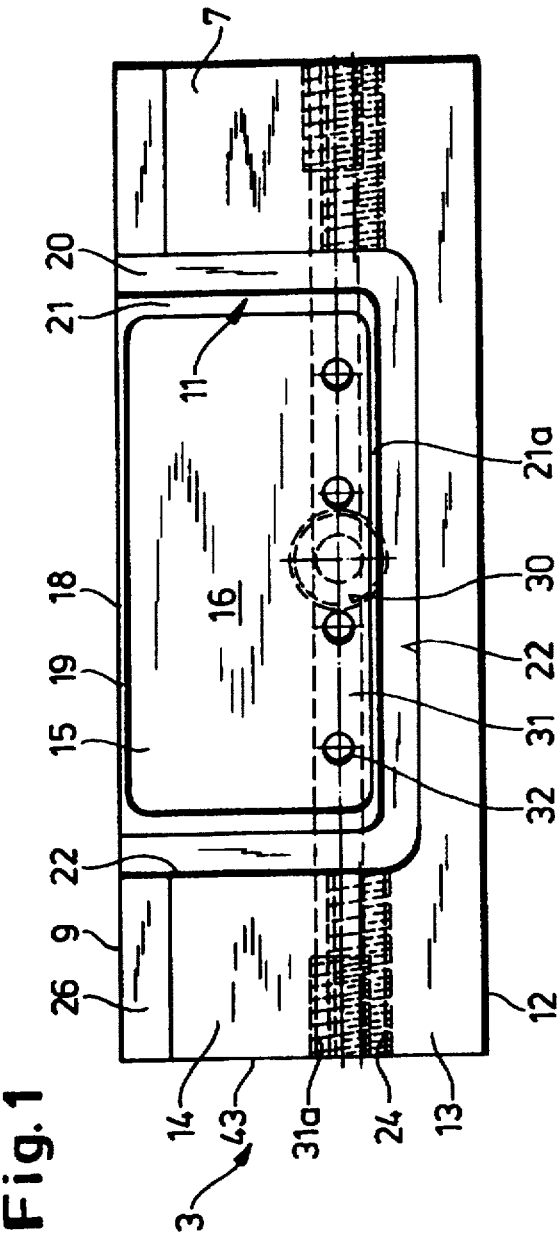
FIG. 1 is a front view of the main body portion of an apparatus according to the invention.

Referring generally to the drawings, reference numeral 1 therein denotes an apparatus for applying a liquid medium, for example a liquid or viscous substance, as indicated generally at 2, for example a glue, paint, dye or the like. The application of liquid medium may more particularly be effected over a relatively wide area. The apparatus 1 includes a main body portion 3 and a bar-like or plate-like member 4 which is referred to herein as the control member 4 and which is mounted pivotably on the body portion. Defined between a part of the body portion 3 and a part of the control member 4 is an application slot which can be clearly seen for example from FIG. 7 in which it is identified by reference numeral 5. The application slot 5 serves for discharge of the liquid medium 2 to be applied from the apparatus and thus provides for application thereof to a surface to which the liquid medium is to be applied. The width of the application slot 5 can be varied by displacement of the control member 4 relative to the body portion 3, so that the application slot 5 can be varied between a fully opened and a closed position.

The body portion 3 and the control member 4 are each of an approximately cuboid configuration with a common plane of symmetry as indicated at 6 in FIG. 4, which extends perpendicularly to the application slot 5. Hereinafter the side of the body portion 3 which is towards the control member 4 is referred to as the front side 7 while the side of the control member 4 which is towards the body portion 3 is referred to as the rear side 8 of the control member. The sides of the body portion 3 and the control member 4, which are upward in FIGS. 1 through 3, 5 and 7 and which form the application slot 5 are referred to as the top sides 9 and 10 thereof. The other sides will be identified in corresponding fashion.

At its front side 7 the body portion 3 has a recess 11 of generally rectangular configuration, into which the control member 4 is fitted. The recess 11 extends on both sides of the plane of symmetry 6 from the top side 9 of the body portion 3 as far as a base portion as indicated at 13 in FIGS. 5 and 7, which is formed by the body portion 3 at the underside 12 thereof. The recess 11 is delimited at the sides by side land portions as indicated at 14 in FIGS. 1, 4 and 6, of the body portion 3. The wall 15 of the body portion 3, which is set back in the recess 11 and which is disposed opposite the control member 4 when in the installed condition thereof is provided with a rectangular pocket-shaped depression 16 which can be clearly seen for example from FIGS. 4 and 5 and which begins at the top side 9 of the body portion 3 and extends downwardly towards the base portion 13 over approximately three-quarters of the height of the recess 11. The upper edge region 17 terminates in a straight line at the top side 9 of the body portion 3 at an inclined angle and with the top side 9 forms an edge 18 which constitutes a cutting edge and which forms a first longitudinal edge 19 of the application slot 5 and which, in conjunction with the control member 4, permits the liquid medium 2 which is to be applied to be precisely cut off, when the application slot 5 is closed.

Extending around the rectangular depression 16 in a U-shape is a groove 20 of rectangular cross-section which is separated from the depression 16 by a land portion 21. The edges of the groove 20, which are remote from the depression 16, are formed by the side land portions 14 and the base portion 13 of the main body portion 3 of the apparatus.

Fitted into the groove 20 is an elastic sealing means 23 which thus extends around the edges of the depression 16 and which is of a generally round cross-sectional configuration, thus constituting what can be referred to as an O-seal. In the compressed condition of the sealing means 23 the cross-sectional area and configuration thereof corresponds to that of the groove 20, while in the condition of not being compressed by the control member 4 the sealing means 23 projects with its upper portion out of the groove 20 or above the land portion 21 to such an extent that the amount thereof which is above the land portion 21 is at least equal to the maximum width of opening of the application slot. In the embodiment described and illustrated herein the maximum width of opening of the application slot 5 is 5/10 mm and the amount by which the sealing means 23 stands proud above the land portion 21 is between 6/10 mm and 7/10 mm so that the sealing means 23 always remains prestressed by an amount corresponding to at least 1/10 mm and bears against the control member 4 with a sealing effect as a result thereof. Accordingly, when the application slot 5 is in an open condition, the liquid medium 2 to be applied issues only through the application slot 5. In the illustrated embodiment, as can be clearly seen from FIGS. 5 and 7, the height of the land part 21a which forms the base of the U-shape defined by the groove 20 and which therefore extends parallel to the application slot 5 is smaller than the height of the upper edge 17 which forms the first longitudinal edge 19 of the application slot 5.

The side land portions 14 of the main body portion 3 of the apparatus, which are thus disposed laterally of the recess 11, each have a respective bore 24 passing therethrough, in parallel relationship with the application slot 5. Each bore 24 is provided with a screwthread into which a holding pin or bolt 25 with an external screwthread thereon can be screwed for mounting the control member 4 on the main body portion 3. The side land portions 14 are each provided on their top side 9 with a respective recess 26 which is provided parallel to the application slot 5 over the entire width of each of the side land portions 14 and which, when the application slot 5 is closed, are approximately aligned with a corresponding recess 27 on the top side 10 of the control member 4.

Figure 5:
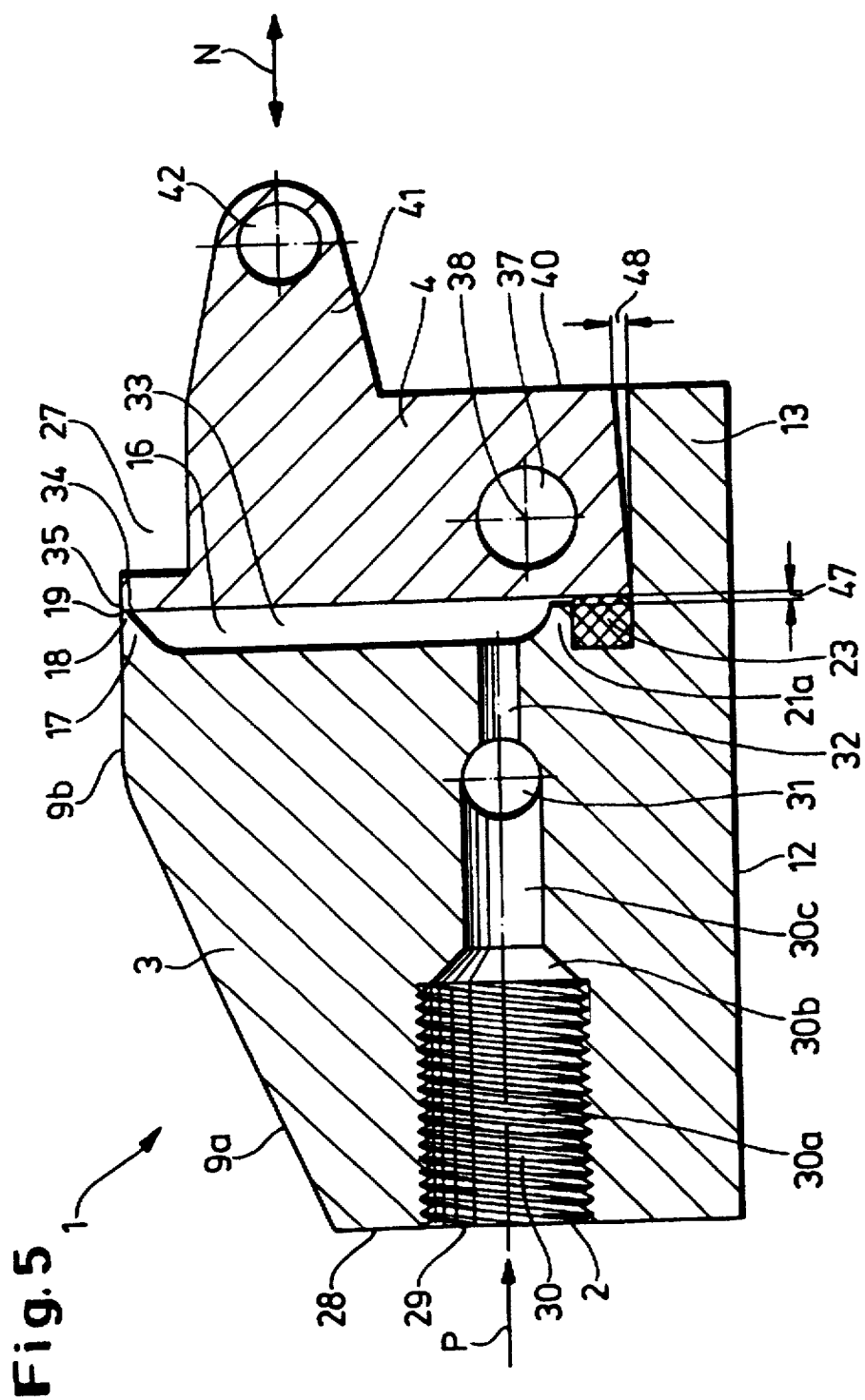
FIG. 5 is a view in cross-section taken along line V—V through the apparatus shown in FIG. 4.
Figure 7:
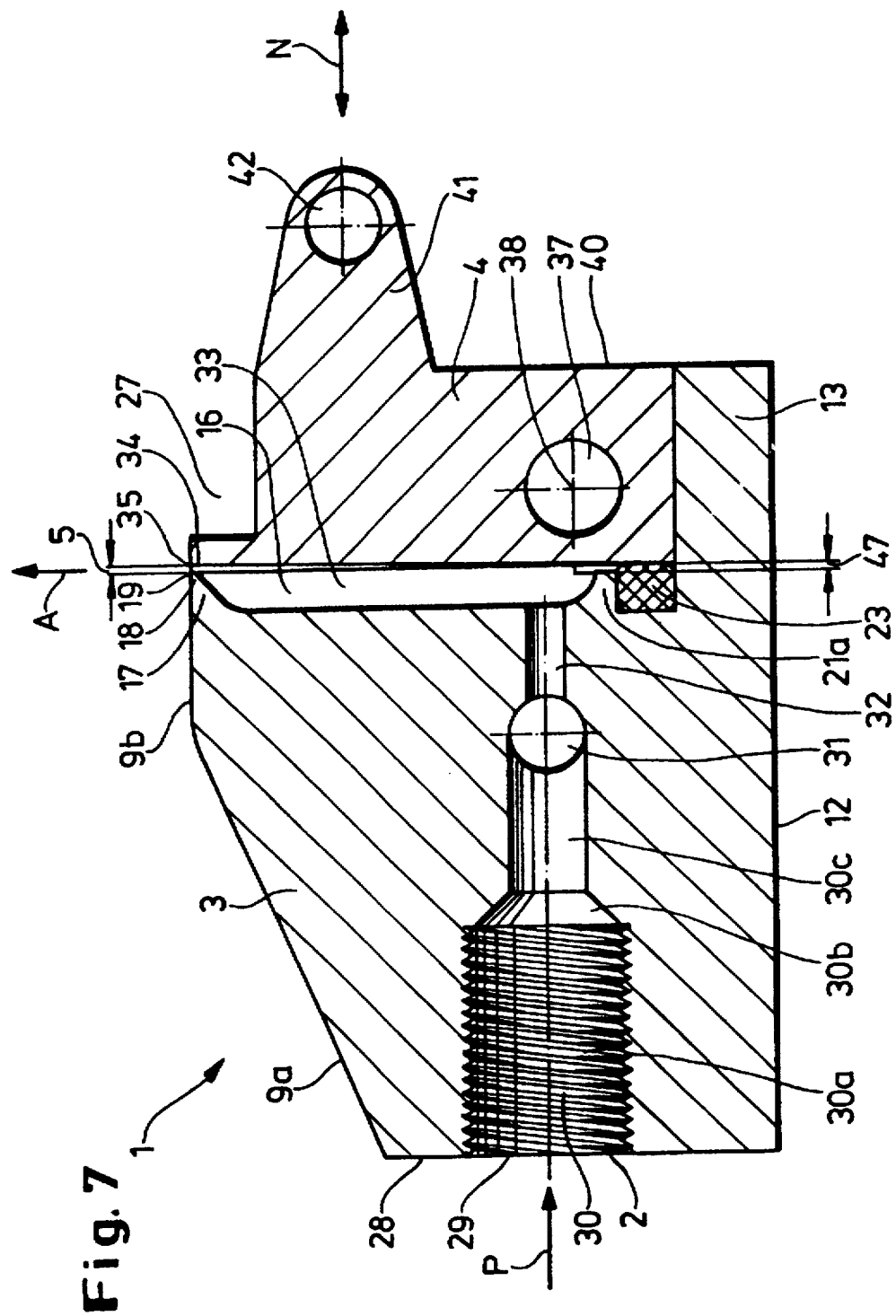
FIG. 7 is a view in cross-section similar to that shown in FIG. 5, but taken along line VII—VII in FIG. 6.

At its top side, in the rearward region thereof, the main body portion 3 has a bevel or chamfer as indicated at 9a for example in FIG. 5 and FIG. 7 so that the region 9b immediately behind the first longitudinal edge 19 of the application slot 5 is the highest region of the top side 9 of the body portion 3.

The rear side 28 of the body portion 3 has a circular intake opening 29 through which the liquid medium 2 to be applied is fed to an intake duct 30, in the direction of the arrow P shown in FIGS. 4 through 7. The intake duct 30 comprises first and second cylindrical portions 30a, 30c of different diameters, which are connected together by a frustoconical portion 30b. All three portions 30a, 30b and 30c are arranged in mutually coaxial relationship. The first portion 30a begins immediately at the intake opening 29, it is of the larger diameter, and it is provided with an internal screwthread into which an element (not shown) having an external screwthread can be screwed in order to introduce the liquid medium 2 to be applied into the body portion 3. Adjoining that first portion 30a is the frustoconical portion 30b whose side which is of the smaller diameter is in flow communication with the third portion 30c of the intake duct 30. The portion 30c of the intake duct 30 opens into a pre-distributor duct 31 which extends transversely with respect to the intake duct 30 or parallel to the application slot 5 and whose diameter is equal to that of the third portion 30c of the intake duct 30. The pre-distributor duct 31 passes through the body portion 3 over the entire length thereof and is provided with a screwthread at each of its two ends as indicated at 31a, 31b. Screwed into each of those ends 31a, 31b is a respective plug (not shown) which prevents the introduced medium 2 from flowing out of the pre-distributor duct 31, which plugs however can also be removed so that for example the apparatus 1 can be cleaned after use thereof. It is however also possible for further elements for providing for the feed of the liquid medium to be applied to be screwed into those ends 31a, 31b in order to facilitate uniform distribution of the liquid medium 2.

The pre-distributor duct 31 in turn is connected to the depression 16 at the front side 7 of the body portion 3 by way of a plurality of distributor ducts 32, of which there are four in the illustrated embodiment, and which extend in the direction of the intake duct 30. The diameter of the distributor ducts 32 is smaller than that of the pre-distributor duct 31. The distributor ducts 32 open into the lower region of the recess 16.

Figure 2:
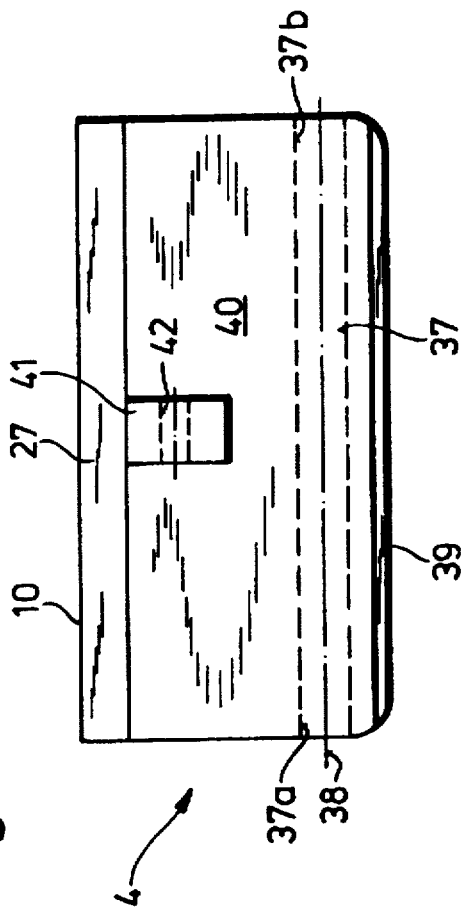
FIG. 2 is a front view of a control member to be operatively associated with the main body portion of the FIG. 1 apparatus.

Reference will now be made more specifically to FIGS. 2 and 3 showing the plate-like or bar-like control member 4. The rear side 8 thereof is in the form of a flat wall surface and defines a pre-distributor chamber 33 in conjunction with the recess 16 on the front side 7 of the body portion 3 and with the sealing means 23. The upper edge 34 of the wall surface formed by the rear side 8 of the control member 4 forms the second longitudinal edge 35 defining the application slot 5 and, in the installed condition of the control member 4, is disposed opposite the first longitudinal edge 9 provided on the body portion 3. The upper part of the wall formed by the rear side 8 of the control member 4 is formed by an extension 36 which extends in the form of a narrow web or limb on the top side 10 of the control member 4 over the entire length thereof and which thus defines the recess 27 substantially aligned with the recesses 26 on the top side 9 of the side land portions 14. Disposed in the lower region of the control member 4 is a bore 37 which extends over the entire length thereof and into the respective ends 37a and 37b of which is fitted a holding pin or bolt 25 for providing a pivot axis 38 for the control member 4. The underside 39 of the control member 4 is inclined upwardly from the rear side 8 thereof to the front side 40, as can be clearly seen from FIG. 3. Provided on the front side 40 of the control member 4 flush with the top side 10 thereof is a lug 41 through which passes a bore 42 for fixing an actuating means (not shown) for displacement of the control member 4 relative to the body portion 3 of the apparatus.

For the purposes of assembly of the apparatus the control member 4 is fitted into the recess 11 in the body portion 3 in such a way that the bores 24 in the side land portions 14 of the body portion 3 are aligned with the bore 37 in the lower region of the control member 4. In that case the control member 4 comes into sealing contact with the O-seal 23 whereby the seal 23 is pushed back into the groove 20 and subjected to a prestressing effect. For the purposes of mounting the control member 4 in place, a respective pin or bolt 25 is introduced into the bores 24 in the side land portions 14 from the outsides 43 of the body portion 3. Each holding pin or bolt 25 has a head 44 which bears against the outside 43 of the body portion 3 when the pin or bolt 25 is fully inserted. Adjoining the head 44 is a first pin or bolt portion 45 which has an external screwthread and which is screwed into the screwthread in the bore 25 in the side land portions 14. Extending coaxially from the first portion 45 is a second pin or bolt portion 46 which is smooth, that is to say it does not have a screwthread, and which extends from the bore 24 in the respective side land portion 14 into the bore 37 in the control member 4 and thus forms the pivotal connection between the body portion 3 and the control member 4. Actuation of the control member 4 can be effected for example by way of mechanical devices (not shown), such as for example a pneumatic piston-cylinder arrangement, or hydraulic actuating means, or by a spring-actuated device, all of which are operative in the direction of the double-headed arrow indicated at N in FIGS. 4 through 7.

Reference is now made to FIGS. 4 and 5 showing the apparatus 1 with the application slot 5 in the closed condition. The application slot 5 is closed by its second longitudinal edge 35, that is to say the upper edge 34 of the control member 4, coming to bear sealingly against the first longitudinal edge 19 or the upper edge 18 of the depression 16 in the body portion 3. In that case, by virtue of the fact that the first longitudinal edge 19 is of a cutting edge-like configuration, the liquid medium 2 to be applied is cut off just as though by means of a blade or knife when the application slot 5 is closed, thus ensuring that the flow of medium 2 to be applied is precisely cut off upon closure of the application slot 5. The elastic seal 23 is compressed into the groove 20 by the control member 4 over the entire length of the seal and thus fills the groove 20 so that in that condition the seal 23 has assumed the rectangular shape of the groove 20 when viewed in cross-section and thus the fact that the compressed seal bears in sealing contact over a substantial surface area against the side walls and the bottom of the groove 20 increases the sealing effect, in comparison with the situation where the application slot 5 is in an open condition, and the seal does not bear against the surfaces defining the groove 20 over the entire surface area thereof. The land part 21a which separates the lower portion of the sealing means 23, which extends parallel to the application slot 5, from the depression 16, does not bear against the control member 4 but leaves free a narrow gap as indicated at 47 in FIG. 5 so that the freedom of movement of the control member 4 is not impeded, upon pivotal motion thereof. As the pivot axis 38 formed by the bores 24, 37 in the side land portions 14 of the body portion 3 and in the control member 4 and by the pins or bolts 25 is arranged somewhat above the lower land part 21a, upon pivotal movement of the control member 4 the part of the control member 4 which is below the pivot axis 38 moves towards that land part 21a and the region of the control member 4 which bears against the sealing means 23 moves slightly into the groove 20. It will be seen therefore from FIG. 4 that, when the application slot 5 is closed, the control member 4 and the land portion 21 bear against each other in the upper region thereof so that in that region the sealing means 23 is not in contact with the liquid medium 2 when the application slot 5 is closed. The inclined underside 39 of the control member 4 affords, between itself and the base portion 13 of the main body portion 3 of the apparatus, a generally wedge-shaped gap 48 which opens towards the front side 40 of the control member 4.

Figure 6:
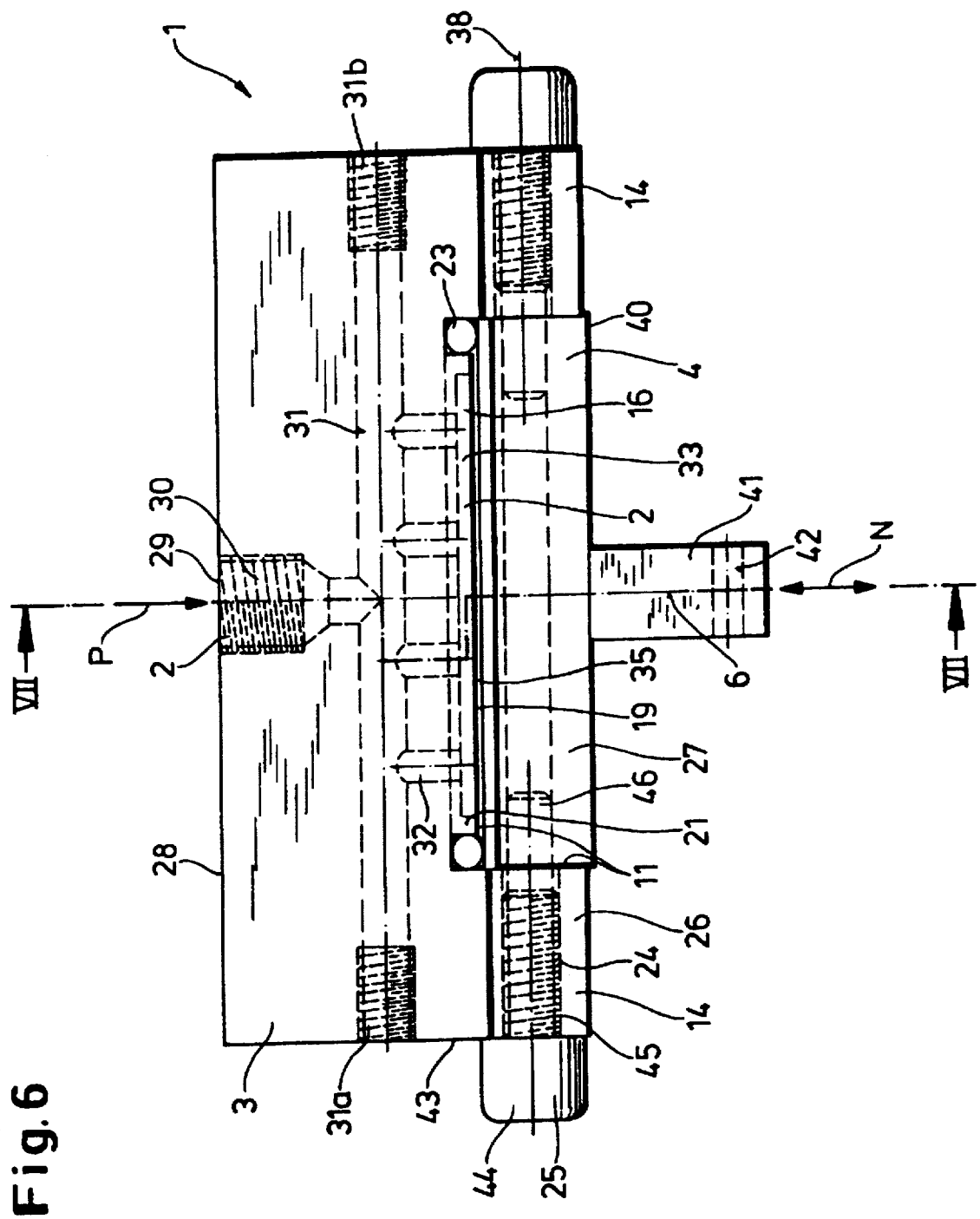
FIG. 6 is a plan view similar to that shown in FIG. 4 but with the application slot in an opened condition.

FIGS. 6 and 7 show the apparatus 1 with the application slot 5 in an open condition. In this condition the liquid medium 2 to be applied issues from the apparatus in the direction indicated by the arrow A in FIG. 7. The part of the control member 4 which is below the pivot axis 38 has moved somewhat towards the body portion 3 so that in this region the spacing relative to the land portion 21 extending around the depression 16 is somewhat reduced and the part of the control member 4 which bears against the sealing means 23 has penetrated somewhat into the groove 20. As a result of the pivotal movement of the control member 4 the wedge-shaped gap 48 between the underside 29 of the control member 4 and the base portion 13 of the body portion 3 of the apparatus is closed.

It will be seen from the plan view of the apparatus 1 shown in FIG. 6 that, when the application slot 5 is opened, the elastic sealing means 23 endeavours to resume its initial round condition, but in that situation it always bears with its upper portion against the control member 4 so that, even when the application slot 5 is open, the arrangement ensures that the transverse edges as indicated at 49 in FIG. 6 are satisfactorily sealed off and the liquid medium 2 to be applied can issue exclusively through the application slot 5. In that respect, the application slot 5 extends laterally beyond the land portions 21 adjoining the depression 16 as far as the sealing means 23, those land portions forming the ends or transverse edges 49 of the application slot 5.

It will be appreciated that the above-described apparatus has been set forth solely by way of example and illustration of the principles of the present invention and that various modifications and alterations may be made therein without thereby departing from the spirit and scope of the present invention.

What is claimed is:

1. Apparatus for applying a liquid medium comprising an application slot having first and second longitudinal edges defining the width of opening of the slot which is fixed by the mutual spacing of the first and second oppositely disposed longitudinal edges, feeding means for feeding the liquid medium to the application slot, and control means for displacing at least one of the first and second longitudinal edges with respect to another of the first and second longitudinal edges such that the first and second longitudinal edges are adapted to be displaced from being in sealing contact with each other to being spaced a selected distance from each other.

2. Apparatus as set forth in claim 1 which includes a main body portion and a control member which is displaceable relative thereto, wherein the first longitudinal edge of the application slot is formed by the main body portion and the oppositely disposed second longitudinal edge of the application slot is formed by the control member.

3. Apparatus as set forth in claim 2 wherein the feeding means for feeding the liquid medium includes a pre-distributor chamber which has at least one intake opening for the liquid medium, the application slot forming a single outlet opening from the pre-distributor chamber.

4. Apparatus as set forth in claim 3 wherein said pre-distributor chamber is defined between mutually oppositely disposed co-operating surfaces of said body portion and said control member.

5. Apparatus as set forth in claim 4 wherein the pre-distributor chamber includes a depression in a wall of the body portion and wherein the depression has an edge which forms the first longitudinal edge of the application slot.

6. Apparatus for applying a liquid medium comprising a main body portion, a control member, an application slot defined by a first longitudinal edge formed by the main body portion and an oppositely disposed second longitudinal edge formed by the control member, a control means for displacing the control member and thereby the first longitudinal edge with respect to the second longitudinal edge such that the spacing between the first and second oppositely disposed longitudinal edges defines the width of opening of the application slot, the first and second longitudinal edges being adapted to be displaced from being in sealing contact with each other to being spaced a selected distance from each other, feeding means for feeding the liquid medium to the application slot, said feeding means including a pre-distributor chamber which has at least one intake opening for the liquid medium, which is defined between mutually oppositely disposed co-operating surfaces of said body portion and said control member and which has a single outlet opening for the liquid medium formed by the application slot, said pre-distributor chamber including a depression in a wall of the body portion having an edge which forms the first longitudinal edge of the application slot, a groove extending around the depression and separated therefrom by a land portion, and an elastic sealing means accommodated in the groove, the cross-sectional shapes of the groove and the sealing means when the sealing means is in a non-compressed condition differing in such a way that in its non-compressed condition the sealing means projects with an upper portion thereof above the groove and bears with a sealing action against the control member and at the same time in the interior of the groove are free regions between the inside surface of the groove and the outside surface of a portion of the sealing means which is disposed in the groove, wherein when the sealing means is compressed by the action of the control member thereon said free regions are filled by receiving the upper portion of the sealing means which is then pressed into the groove, whereby when the sealing means is in the compressed condition the cross-sectional area thereof at least substantially corresponds to that of the groove.

7. Apparatus as set forth in claim 6 wherein the first longitudinal edge of the application slot and the land portion are in one plane.

8. Apparatus as set forth in claim 6 wherein the feeding means for feeding the liquid medium have at least one intake duct opening into a pre-distributor duct which in turn is in flow communication with the pre-distribution chamber by way of distributor ducts.

9. Apparatus for applying a liquid medium comprising: a body portion; a control member displaceable relative to the body portion between first and second positions, the body portion and the control member each having a portion providing a control edge means and the respective control edge means being arranged at positions such that they define an application slot for the liquid medium, the control edge means being at a spacing from each other to open the application slot when the control member is in the first position relative to the body portion and the control edge means being at least substantially in contact with each other when the control member is in the second position thereby to close the application slot; means for feeding the liquid medium to the application slot for selective discharge of the liquid medium through the application slot controlled by the width of opening of the application slot; and means for displacing the control member relative to the body portion between said first and second positions to adjust the width of opening of the application slot.

10. Apparatus for applying a liquid medium comprising a main body portion, a control member, an application slot defined by a first longitudinal edge formed by the main body portion and an oppositely disposed second longitudinal edge formed by the control member, a control means for displacing the control member and thereby the first longitudinal edge with respect to the second longitudinal edge such that the spacing between the first and second oppositely disposed longitudinal edges defines the width of opening of the application slot, the first and second longitudinal edges being adapted to be displaced from being in sealing contact with each other to being spaced a selected distance from each other, feeding means for feeding the liquid medium to the application slot, said feeding means including a pre-distributor chamber which has at least one intake opening for the liquid medium, which is defined between mutually oppositely disposed co-operating surfaces of said body portion and said control member and which has a single outlet opening for the liquid medium formed by the application slot, said pre-distributor chamber including a depression in a wall of the body portion having an edge which forms the first longitudinal edge of the application slot, a groove extending around the depression and separated therefrom by a land portion, and an elastic sealing means accommodated in the groove to seal said pre-distribution chamber so that the liquid medium flows outwardly only through the application slot.

* * * * *